United States Patent

Capuano

[15] 3,637,073

[45] Jan. 25, 1972

[54] SEPARATOR FOR GLASS ARTICLES

[72] Inventor: Charles H. Capuano, Toledo, Ohio

[73] Assignee: Owens-Illinois, Inc.

[22] Filed: Oct. 6, 1969

[21] Appl. No.: 864,114

[52] U.S. Cl. .................206/65 K, 206/46 FC, 206/46 FR, 217/26.5, 220/97 C
[51] Int. Cl. ..............B65d 71/00, B65d 85/00, B65d 21/00
[58] Field of Search ..............206/46 FC, 46 FR, 65 K, 65 R; 217/26.5; 220/2.1 A, 2.3 A, 97 B, 97 C, 97 D, DIG. 13; 229/14 C

[56] References Cited

UNITED STATES PATENTS

| | | | |
|---|---|---|---|
| 1,971,075 | 8/1934 | Lockwood | 206/65 K UX |
| 3,009,603 | 11/1961 | Stockdale | 220/97 C |
| 3,074,582 | 1/1963 | Martelli et al. | 217/26.5 |
| 3,139,207 | 6/1964 | Fredholm | 220/97 C X |
| 3,232,512 | 2/1966 | Wanderer | 220/97 C X |
| 3,265,281 | 8/1966 | Hohnjec | 217/26.5 X |
| 3,530,979 | 9/1970 | Merrill, Jr. et al. | 206/46 R |

Primary Examiner—Joseph R. Leclair
Assistant Examiner—Steven E. Lipman
Attorney—D. R. Brichall and E. J. Holler

[57] ABSTRACT

A plastic-shipping container and separator for an assortment of pieces of glassware of different shapes and sizes. The separator has a conical body for the various ranges of ware sizes. Diagonally spaced support ridges reinforce the body portion of the separator and hold the glassware in spaced relationship to the separator. An annular orifice at the top of the separator permits hot gases entrapped within the conical portion of the glass to escape.

5 Claims, 3 Drawing Figures

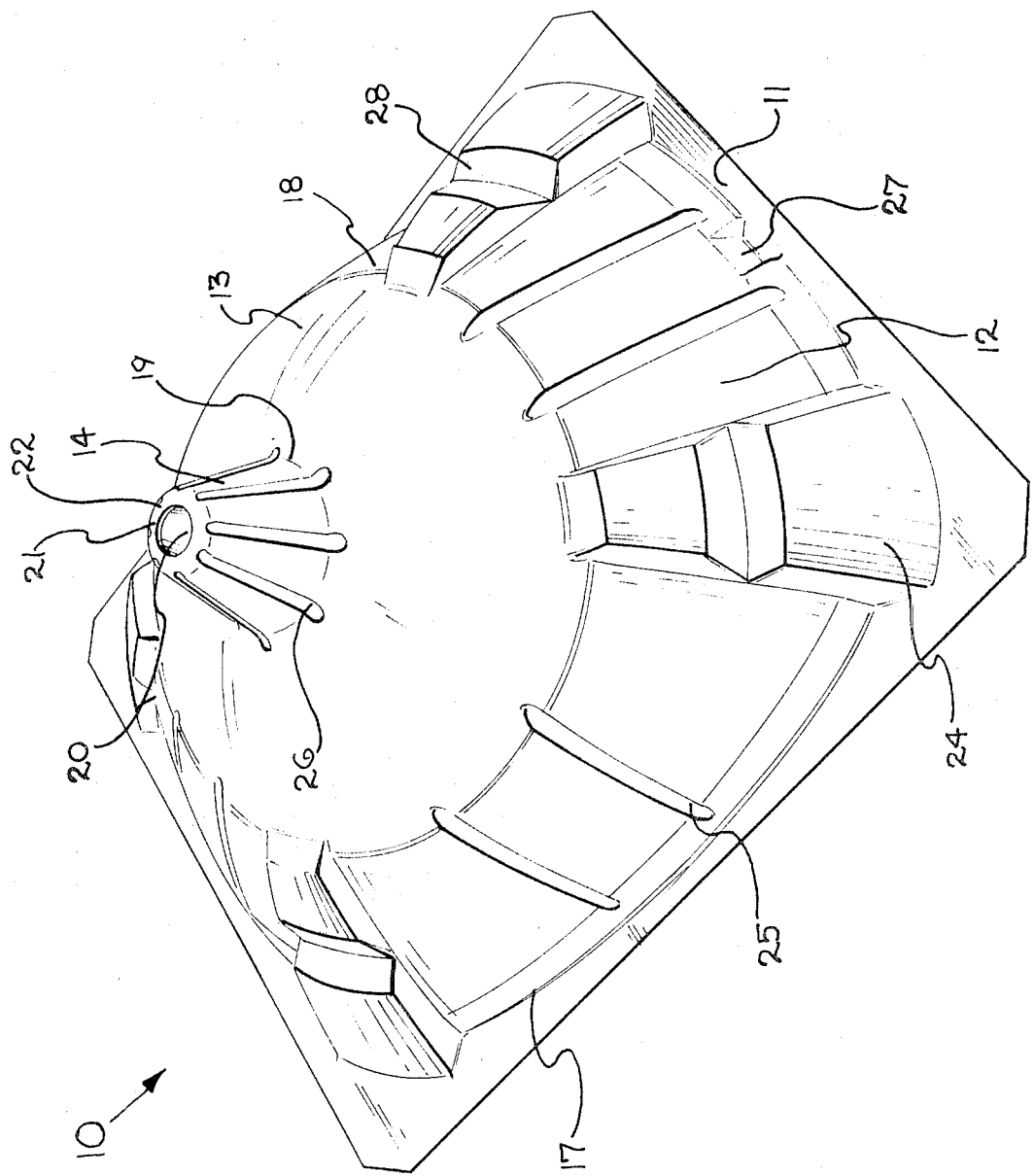

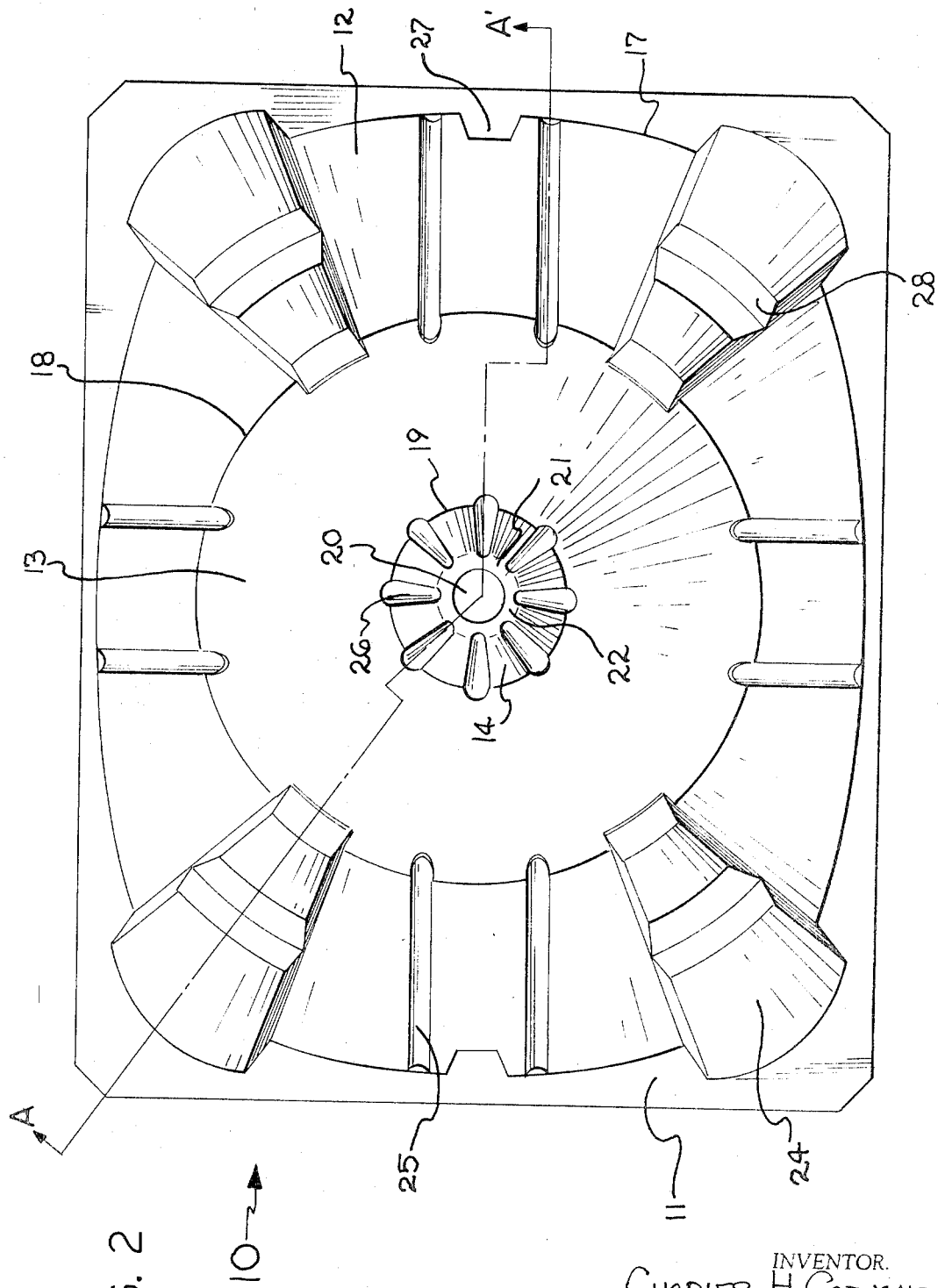

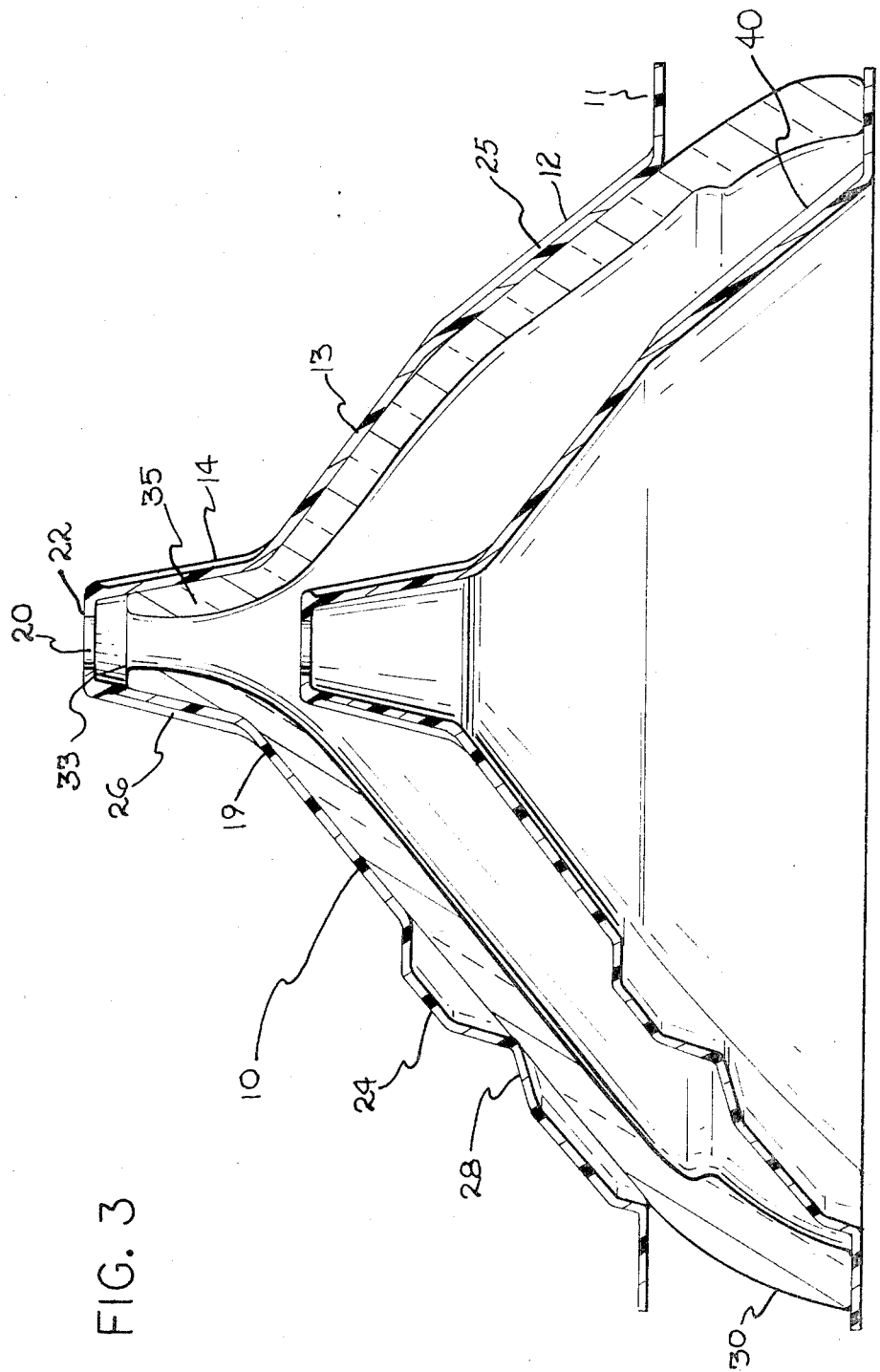

SEPARATOR FOR GLASS ARTICLES

THE INVENTION

This invention relates to a support for holding fragile objects of generally funnel shape and, more particularly, to a reuseable packaging stacker and separator for fragile articles such as large television bulb funnels.

In the manufacture and shipping of television bulb funnels, it is necessary to subject the funnels to various handling operations in the course of which breakage may occur. Because television funnels are fabricated with a relatively large dome-shaped body portion which terminates in a relatively long tubular neck portion, it is especially difficult to stack and hold a plurality of these funnels so that they may be efficiently stored and transported without danger of being broken or scratched.

Prior to this invention, in order to store or transport television bulb funnels in stacked arrangement without causing glass to glass contact, it was necessary to place several corrugated separators between each funnel. The use of these corrugated separators resulted in many disadvantages which ultimately prompted this invention. Those disadvantages included: failing to generally conform to the shape of the bulb funnel in which it was placed; allowing the edges of stacked funnels to slip over the wall of the corrugated separator thereby causing glass to glass contact when a large downward force was exerted on the bottommost separators in a stack of funnels from the funnels on the top portion of the stack; rupturing of the corrugated separator at its apex when the separator was sandwiched between two bulb funnels in a large stack and the nubbin portion of the lower funnel broke through the apex of the separator; rupturing of the corrugated separator at the tape joint when it was subjected to high humidity or dampness; deteriorating when exposed to dampness; cutting through the wall portion of the corrugated separator by the edge of the upper funnels when the funnels were stored in a large stack; requiring prior assembly of the corrugated separator at the glass plant; failing to absorb shocks and jars to the funnel during transportation; requiring more space over preformed plastic separators to pack a given number of funnels; and requiring a different shaped corrugated separator for each funnel.

The present invention is directed to a novel and improved shipping and stacking separator made of plastic and containing a plurality of shock-absorbing ribs to overcome the foregoing disadvantages.

The use of the plastic separator of the type disclosed in this invention also solved another problem in shipping and packaging. During the manufacture of television bulb funnels and immediately prior to the packing of the funnels in large stacks, the hollow nubbin area or neck area of the funnel is completely sealed. In the case of funnels for black and white television bulbs, in order to create an opening at the top of the nubbin area to receive an electron gun assembly, the nubbin of the funnel is subjected to a jet of hot gases to burn off the top portion or ring at the end of the nubbin. Immediately after these rings are burned off, the funnels are placed in large cartons for stacking. Consequently, the tops of the nubbin are still quite hot. If the packer were then to apply a corrugated separator over the funnel, the hot gases remaining within the bulb would be entrapped therein and would cause reheating of the top of the nubbin area, resulting in the removal of a second ring of glass. This action is referred to in the art as "ring-off." To overcome this problem, an annular opening was placed in the top part of the separator to allow for the escape of hot gases from the interior of the bulb funnel.

Therefore, it is a principal object of this invention to provide a plastic separator with an opening at the top thereof which will allow hot gases to escape from the bulb funnel over which it is placed.

It is another principal object of this invention to provide a plastic separator containing a plurality of support and shock-absorbing ribs for shipping and storing television bulb funnels.

Another object of this invention is to provide a plastic separator which can be used with a wide variety of shapes and sizes of television bulb funnels.

Another object of this invention is to provide a plastic support for television bulb funnels which generally conform to the interior curvature of the funnel.

Another object of this invention is to provide a shipping container which is durable enough to withstand the sharp cutting edges of a television bulb funnel and yet is not so hard as to scratch or mar the surface of the funnel.

Another object of this invention is to provide a shipping container for television bulb funnels which will have a longer, useful life than a similar corrugated container.

The accompanying drawings illustrate the specific embodiments of the plastic separator.

IN THE DRAWINGS

FIG. 1 is a perspective view of the outside of the plastic separator.

FIG. 2 is a top plan view of the outside of the plastic separator.

FIG. 3 is a vertical section view depicting the functional aspects of the invention when a television bulb funnel is positioned between and in stacked array with the separators, the sectional view through the stacked array corresponding in location and viewing direction to section plane A-A' in FIG. 2.

When packing fragile objects such as television bulb funnels for shipment from the manufacturer to the distributor or user, it is the usual practice to pack such articles in units of 12 or thereabouts, depending upon the type of funnel, arranged in a plurality of rows in vertically spaced layers within a rectangular box or crate. Intermediate the separate rows of funnels are normally interposed support-protectors formed of a cushioning material. The instant invention is devoted to providing an improved stacker which can be used to pack any number of rows of such fragile objects in the supporting crate or box.

The principal parts of the improved stacker include a frustoconical wall section; a funnel-shaped body portion; a truncated conical throat section, and a flat base section.

In the structure shown in the drawings, FIGS. 1 and 2 indicate a support-separator 10 of the type of this invention formed of a molded plastic material having a thickness of 0.010 to 0.10 inch. It comprises a flanged, relatively stiff, flat base 11 of generally rectangular outline. This base serves to prevent glass to glass contact when the funnels are stacked intermediate the separators and extends outwardly from conical wall section 12 a distance at least equal to the thickness of the glass funnel which is stored thereon. Extending up from the base 11 and formed integral therewith is a frustoconical wall section 12 which intersects base 11 in a line which, along the long axis side of the rectangular base, has a radius of curvature generally equal to the radius of curvature of the long axis side of the bulb funnel to be stored. The radius of curvature of line formed at the intersection of wall section 12 and base 11 is generally equal to the radius of curvature of the short axis side of the bulb funnel to be stored. Wall section 12 is angularly disposed with respect to base 11 so that the exterior of the bulb funnel to be stored generally coincides with the interior of wall section 12. Therefore, wall section 12 could intersect the plane of the base 11 at an interior angle which is greater than 0° and less than 90°. The central axis of wall section 12 is perpendicular to the plane formed by base 11 and intersects the plane at a point where the diagonal axis of the base intersects.

Conical wall section 12 extends generally upwardly and intersects the funnel-shaped body portion 13 of the separator, which is formed integrally with conical wall section 12, at line 18. The interior angle between body portion 13 and the plane formed by the intersection of wall section 12 and body portion 13 must be greater than 0° and less than 90°. In some instances, body portion 13 will correspond to the extension of conical wall section 12, thus eliminating intersection line 18.

In all cases, body portion 13 is designed to coincide with the surface of the television bulb funnel stored thereon and the central axis of body portion 13 is designed to coincide with the central axis of wall section 12.

The funnel-shaped body portion 13 extends generally upwardly to intersect the truncated conical throat section 14 along line 19. This section of the separator generally corresponds to the geometry of the nubbin area 35 of a television bulb funnel 30 which is placed thereon as shown in FIG. 3. The top portion of throat section 14 is plane 22 which is parallel to base 11 and contains a central flange 21 and an annular opening 20. The central axis of throat section 14 coincides with the central axis of wall section 12. The bottom portion of throat section 14 is a plane parallel to base 11 and intersects body portion 13. Opening 20 serves the purpose of allowing hot gases from the interior of the funnel to escape when plastic separator 10 is placed over a funnel. In FIG. 3, throat section 14 is also of such length and tapered in such a manner that when a bulb funnel 30 is placed between two separators 10 and 40, the top plane 33 of nubbin area 35 of bulb funnel 30 does not contact flange 21 of upper separator 10, but rather comes to rest on a plane below that of flange 21.

The preferred embodiment of the plastic separator also includes a plurality of external support ribs 24 and internal support channels or ribs 25 and spacing grooves or ribs 26.

For example, conical wall section 12 contains external support ribs 24 oriented on the diagonal axis sides or corner wall portions of wall section 12. These spacing ribs extend radially outwardly from the wall section 12 and are generally arc-shaped to coincide with the surface of the inside of a bulb funnel. They intersect flanged base section 11 along line 17 and may extend above or below line 18. When a plurality of separators are mounted one on top of another in a stack, as shown in FIG. 3, with a bulb funnel 30 between each separator, ribs 24 serve both to reinforce conical wall section 12 and to hold the bulb funnel placed thereon in spaced relationship with the wall section, thereby providing some means to absorb shock and jars during transit. Although the preferred embodiment shows the ribs 24 located on the diagonal axis sides or corner wall portions of the separator wall section 12, it is possible to place ribs anywhere on wall section 12.

Support ribs 24 also contain therein ledge 28 which is used to hold the edge of a smaller diameter bulb funnel, particularly a 19-inch bulb, which does not contact base 11.

channels 25 are located between spacing ribs 24 and serve to reinforce wall section 12. These channels can be of any size and spacing so long as they keep wall section 12 from buckling under the pressure of a large stack of bulb funnels. In this embodiment, support channels 25 of separator 10 are shown in FIG. 3 as extending radially inwardly to contact the outer surface of bulb funnel 30.

The short axis sides of the wall section 12 also contain a notch 27 adjacent the line 17 of juncture of the wall section 12 with the base 11. When a large number of funnels were stacked one on top of another, the edge of the top television bulb funnel will slide down the wall section 12 and over the flange portion of the base 11 and scratch the surface of the funnel below. By placing notch 27 in this position on the short side axis the notch will accommodate outward deflection of the base 11 so that bulb funnel 30, when subjected to the weight of a large stack of funnels, will deflect the flanged base section 11 outward. This eliminates glass to glass contact along the edge of the funnel.

In FIG. 3, a number of inwardly extending spacing grooves 26 are placed in throat section 14 of separator 10. These grooves are of such a depth to prevent the top plane 33 of the nubbin 35 of bulb funnel 30, placed under separator 10, from contacting annular flange 21. In this manner, only the exterior wall of the nubbin area 35 of glass bulb funnel 30 touches the interior of throat section 14 of separator 10.

FIG. 3 shows a bulb funnel 30 placed between an upper separator 10 and a lower separator 40 in stacked arrangement. The interior of the nubbin area 35 of bulb funnel 30 contacts the exterior of throat section 14 of separator 40 while the remainder of the interior of funnel 30 contacts body section 13 and spacing ribs 24 of separator 40. At the same time, the exterior of sandwiched bulb funnel 30 contacts the interior surface of separator 10 at spacing grooves 26, at support channels 25, and at wall section 12.

The top plane 33 of the nubbin area 35 of bulb funnel 30 does not contact flange 21. The exterior surface of nubbin area 35 of funnel 30 is securely engaged by grooves 26 thereby maintaining the top plane 33 of the nubbin 35 of funnel 30 in spaced relation to flange 21.

From the foregoing description, it will be seen that this invention provides a rigid shock resistant separator which is especially designed to receive and hold television bulb funnels of various shapes in a protected position when the bulbs are transported or stored in stacked arrangement.

Because many widely different embodiments of this invention may be made without departing from the spirit and scope hereof, it is understood that the invention is not limited to the specific embodiments hereof except as defined in the appended claims.

I claim:

1. A plastic separator for stacking fragile articles which comprises:

a generally rectangular base;

a generally frustoconical wall section intersecting said base, said wall section defining an interior cavity having a central axis disposed perpendicular to the plane of said base;

means on said frustoconical wall section in the form of arcuately shaped support ribs, said support ribs each extending radially outwardly from said wall section and having a top portion and a bottom portion wider than said top portion and intersecting said rectangular base, whereby to support an article to be placed thereon in spaced relationship to said wall section;

a truncated conical throat section having a top and bottom section and a central axis coinciding with the central axis of said wall section, said top section defining a central opening therein and said bottom section being integrally connected to said wall section at a location remote from said base; and means on said throat section extending radially inwardly therefrom for holding the top of the article to be stacked thereover in spaced relationship to the top section thereof.

2. The plastic separator as claimed in claim 1, wherein said means of said throat section forms a radially inwardly extending flange defining an annular opening therein.

3. The plastic separator as claimed in claim 1, wherein said support ribs are diagonally spaced on said wall section to hold the articles to be stacked.

4. The plastic separator as claimed in claim 1, wherein said wall section contains a plurality of inwardly extending reinforcing ribs spaced between said support ribs for contacting the exterior surface of a fragile article when the articles are arranged in stacked position.

5. In combination, a plastic separator comprising:

a generally rectangular base;

a generally frustoconical wall section defining a hollow interior and merging into said base and defining a central axis perpendicular to said base;

a plurality of peripherally spaced support ribs protruding outwardly from said wall section;

a truncated conical throat section axially concentric with said wall section and having a bottom portion merging integrally with said wall section and having a top section projecting axially outward from said wall section and defining a central opening therein communicating with the hollow interior of said wall section;

and a fragile television bulb funnel snugly nested over said plastic separator and gravitationally supported upon said support ribs in spaced relationship to said wall section and in substantially concentric relationship therewith.

UNITED STATES PATENT OFFICE
CERTIFICATE OF CORRECTION

Patent No. 3,637,073  Dated January 25, 1972

Inventor(s) CHARLES H. CAPUANO

It is certified that error appears in the above-identified patent and that said Letters Patent are hereby corrected as shown below:

Cover Page, 2nd Col, after "Attorney-", "D.R. Brichall" should be ---D.R. Birchall---. Col. 3, lines 11 and 12, after "contains" delete "a central flange 21 and an annular opening 20"; Col. 3, lines 11 and 12, after "contains" insert ---an annular flange 21 and a central opening 20---; Col. 3, line 46, before "Channels" insert ---Support---; Col. 3, line 46, "Channels" should be ---channels---; Col. 3, line 59, "flange" should be ---flanged--- Col. 4, line 49, "of" should be ---on---.

Signed and sealed this 8th day of May 1973.

(SEAL)
Attest:

EDWARD M.FLETCHER,JR.  ROBERT GOTTSCHALK
Attesting Officer  Commissioner of Patents